(12) United States Patent
Barkeloo

(10) Patent No.: US 8,001,123 B2
(45) Date of Patent: *Aug. 16, 2011

(54) OPEN SOURCE PUBLISHING SYSTEM AND METHOD

(75) Inventor: Jason E. Barkeloo, Cincinnati, OH (US)

(73) Assignee: Somatic Digital LLC, Cincinnati, OH (US)

( * ) Notice: Subject to any disclaimer, the term of this patent is extended or adjusted under 35 U.S.C. 154(b) by 536 days.

This patent is subject to a terminal disclaimer.

(21) Appl. No.: 11/974,190

(22) Filed: Oct. 11, 2007

(65) Prior Publication Data

US 2008/0091716 A1 Apr. 17, 2008

Related U.S. Application Data

(60) Provisional application No. 60/850,983, filed on Oct. 11, 2006.

(51) Int. Cl.
*G06F 17/30* (2006.01)

(52) U.S. Cl. ........ 707/736; 707/754; 715/763; 715/769; 715/838; 715/859

(58) Field of Classification Search .................. 707/736, 707/754; 715/763, 769, 838, 859
See application file for complete search history.

(56) References Cited

U.S. PATENT DOCUMENTS

| | | | |
|---|---|---|---|
| 4,525,606 A | 6/1985 | Sado | |
| 4,901,074 A | 2/1990 | Sinn et al. | |
| 5,401,922 A | 3/1995 | Asta | |
| 5,534,857 A | 7/1996 | Laing et al. | |
| 5,574,623 A | 11/1996 | Girard | |
| 5,624,265 A | 4/1997 | Redford et al. | |
| 5,677,955 A | 10/1997 | Doggett et al. | |
| 5,710,889 A | 1/1998 | Clark et al. | |
| 5,715,314 A | 2/1998 | Payne et al. | |

(Continued)

FOREIGN PATENT DOCUMENTS

JP 07319982 12/1995

(Continued)

OTHER PUBLICATIONS

Levy, et al, Going digital: a look at assumptions underlying digital libraries, In Communications of the ACM, vol. 38, Issue 4, p. 77-84. Pub. Apr. 1995, [retrieved on Mar. 11, 2008], Retrieved from the internet: <URL: http:/www.csdi.tamu.edu/-marshall/cacm-dl-levy-mrshall:pdf>.

*Primary Examiner* — Jean M Corrielus
(74) *Attorney, Agent, or Firm* — Taft, Stettinius & Hollister

(57) ABSTRACT

It is a first aspect of the present invention to provide a method of publishing content including the steps of: (a) providing a printed publication having printed content, a storage device storing a content database having digital content, an output device for outputting the digital content, and an interactive user device for generating one or more signals associated with retrieval of the digital content from the storage device; (b) accessing digital content; (c) associating the digital content with the printed content; (d) storing in a mapping database the association and a location of the digital content; (e) actuating the interactive user device to generate the one or more signals; (f) querying the mapping database to determine the association and the location of the digital content; (g) upon determining the location, retrieving the digital content; and (h) outputting the digital content to the output device.

7 Claims, 3 Drawing Sheets

U.S. PATENT DOCUMENTS

| | | | |
|---|---|---|---|
| 5,737,619 A | 4/1998 | Judson | |
| 5,747,757 A | 5/1998 | Van Zeeland et al. | |
| 5,749,735 A | 5/1998 | Redford et al. | |
| 5,757,304 A | 5/1998 | Redford et al. | |
| 5,763,112 A | 6/1998 | Redford | |
| 5,788,507 A | 8/1998 | Redford et al. | |
| 5,839,905 A | 11/1998 | Redford et al. | |
| 5,889,862 A | 3/1999 | Ohta et al. | |
| 5,911,582 A | 6/1999 | Redford et al. | |
| 5,929,401 A | 7/1999 | Flegeo et al. | |
| 5,957,695 A | 9/1999 | Redford et al. | |
| 5,974,146 A | 10/1999 | Randle et al. | |
| 6,230,148 B1 | 5/2001 | Pare, Jr. et al. | |
| 6,327,459 B2 | 12/2001 | Redford et al. | |
| 6,380,497 B1 | 4/2002 | Hashimoto et al. | |
| 6,563,435 B1 | 5/2003 | Platz | |
| 6,583,799 B1 * | 6/2003 | Manolis et al. | 715/838 |
| 6,650,867 B2 | 11/2003 | Redford et al. | |
| 6,701,303 B1 | 3/2004 | Dunn et al. | |
| 6,839,905 B1 | 1/2005 | Bruder et al. | |
| 6,898,601 B2 * | 5/2005 | Amado et al. | 707/10 |
| 6,967,299 B2 | 11/2005 | Howie et al. | |
| 6,968,151 B2 | 11/2005 | Redford et al. | |
| 7,146,575 B2 * | 12/2006 | Manolis et al. | 715/838 |
| 2002/0194081 A1 * | 12/2002 | Perkowski | 705/26 |
| 2003/0063072 A1 | 4/2003 | Brandenberg et al. | |
| 2004/0008226 A1 * | 1/2004 | Manolis et al. | 345/769 |
| 2005/0010475 A1 * | 1/2005 | Perkowski et al. | 705/14 |
| 2005/0210413 A1 * | 9/2005 | Quek et al. | 715/838 |
| 2006/0005205 A1 | 1/2006 | Illowsky et al. | |

FOREIGN PATENT DOCUMENTS

| | | |
|---|---|---|
| WO | WO 2008/045514 | 4/2008 |

* cited by examiner

OPEN SOURCE PUBLISHING SYSTEM AND METHOD

CROSS-REFERENCE TO RELATED APPLICATIONS

This application claims the benefit of U.S. Provisional Application Ser. No. 60/850,983, entitled "OPEN SOURCE PUBLISHING SYSTEM," filed on Oct. 11, 2006, the disclosure of which is incorporated herein by reference.

FIELD OF THE INVENTION

The present invention relates to an open source publishing method and system is disclosed that allows individuals to select digital content objects from a database of available content for use in the development of interactive hybrid printed material.

BACKGROUND OF THE INVENTION

Innovations have begun to transform conventional books and other printed publications into multimedia interactive devices. Printed publications have been fitted to connect electronically with computers and other media storage devices to retrieve and display digital content. In some instances, the printed publications have an integrated remote control device capable of interacting wirelessly with the media storage devices and in other instances, the printed publications are tethered to the media storage devices with a local connection such as a USB connection or cable connection. This technology enables, for example, a reader to press the pictures and words on the regular printed ink and paper page and retrieve digital content from a computer or other media storage device.

Creators and publishers of content for use with these multimedia interactive devices may desire to make their content available for purchase. However, some content providers may not provide the type, format or layout of content that users desire. Therefore, there is currently a need to allow any user to become a creators and/or a publisher to create content in any manner. The present invention desires to fulfill that need.

SUMMARY OF THE INVENTION

The present invention solves the above problem by providing a system and method allowing any user to create interactive hybrid materials in any manner.

It is a first aspect of the present invention to provide a method of publishing content including the steps of: (a) providing a printed publication having printed content, a storage device storing a content database having a plurality of digital content, an output device for outputting one or more representations of the plurality of digital content, and an interactive user device for generating one or more signals associated with retrieval of the plurality of digital content from the storage device based, at least in part, on input of a user; (b) accessing by the user the plurality of digital content; (c) associating one of the plurality of digital content with the printed content; (d) storing in a mapping database the association of one of the plurality of digital content with the printed content and a location within the storage device of the one of the plurality of digital content; (e) actuating by a user the interactive user device to generate the one or more signals associated with retrieval of the plurality of digital content; (f) querying the mapping database to determine the association of one of the plurality of digital content with the printed content and the location within storage device of the one of the plurality of digital content; (g) upon determining the location of the digital content, retrieving the digital content from the storage device; and (h) outputting the one or more representations of the digital content to the output device.

In one embodiment of the first aspect, the accessing step includes the additional steps of: generating by the user additional digital content, and storing the additional digital content on the storage device. In another embodiment, the method further includes allowing one or more third parties access to the plurality of digital content. In another embodiment, the method further includes allowing one or more third parties representations of the printed publication.

In another embodiment of the first aspect, the outputting step includes transmitting the one or more representation of the digital content to a display device. In another embodiment, the outputting step includes transmitting the one or more representation of the digital content to an audio output device. In one embodiment, the additional step of categorizing the digital content for subsequent searching, the categorizing including associating keywords with the plurality of digital content and storing the keywords in a search database, the search database including the location within the storage device of each of the plurality of digital content is provided. In some embodiments, the digital content includes one or more of audio content, video content, text content, picture content, graphic content, mathematics content, scientific content, sign language content, animation content, email content and Internet content.

It is a second aspect of the present invention to provide a system for open source publishing including a printed publication having a plurality of printed content, a plurality of digital content, a digital content storage device adapted to store the plurality of digital content, the digital content storage device further adapted to make the plurality of digital content available to a user, an interactive multimedia user device having a membrane switch, the interactive multimedia user device adapted to request digital content from the digital content storage device upon actuation of a portion of the membrane switch, and an output device for outputting a representation of the digital content. In one embodiment, the user associates the plurality of printed content with the plurality of digital content.

In one embodiment of this aspect, the digital content storage device includes a network resource, a website, a hard disk drive, a solid state disk drive, a flash memory drive and/or a CD-ROM. In another embodiment, the plurality of digital content is generated by one or more of an author, a student, a teacher, a doctor and a tutor. In another embodiment, the plurality of digital content includes audio content, video content, text content, picture content, graphic content, mathematics content, scientific content, sign language content, animation content, email content and/or Internet content. In one embodiment, a keyword database that associates keywords with digital content is also provided.

From the foregoing disclosure and the following detailed description of various preferred embodiments it will be apparent to those skilled in the art that the present invention provides a significant advance in the art. Additional features and advantages of various preferred embodiments will be better understood in view of the detailed description provided below.

BRIEF DESCRIPTION OF THE DRAWINGS

The present invention will be understood and appreciated more fully from the detailed description in conjunction with the following drawings in which.

DETAILED DESCRIPTION

Figure 1:
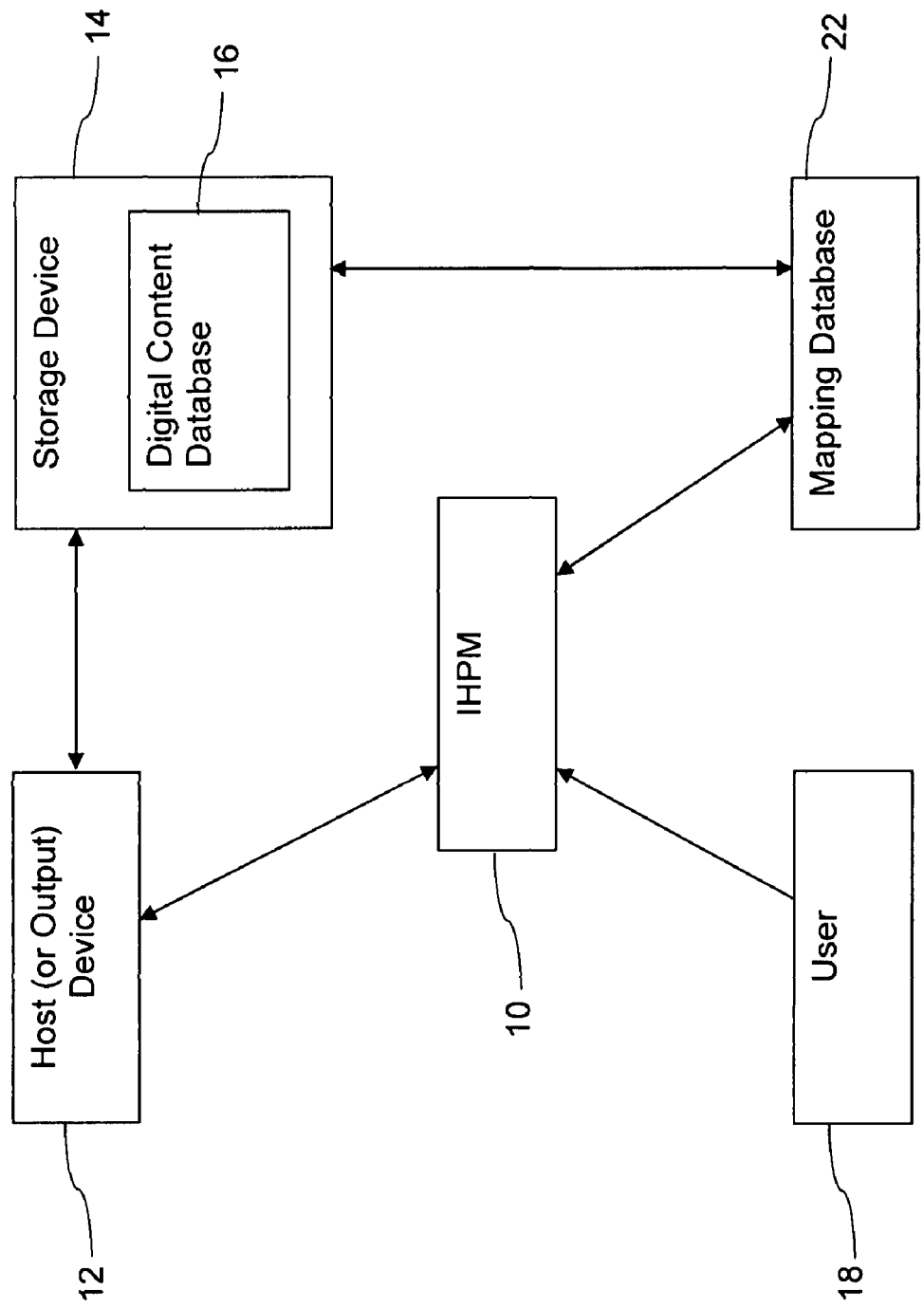
FIG. 1 is a diagram of an exemplary embodiment of an interactive hybrid printed material environment.

It will be apparent to those skilled in the art that many uses and variations are possible for the system and method disclosed herein. The following detailed discussion of various alternative and preferred embodiments will illustrate the general principles of the invention. Other embodiments will be apparent to those skilled in the art given the benefit of this disclosure.

Recently, printed publications have been fitted to connect electronically with computers 12 and other media output devices (such as display devices or audio devices) to retrieve and display digital content (such printed publications shall be referred to as "interactive hybrid printed material" or "IHPM"). In some instances, the IHPMs 10 have an integrated remote control device capable of interacting wirelessly with the media output devices (herein, a "remote interactive hybrid printed material" or "remote IHPM"), and in other instances, the IHPMs 10 are tethered to the media output devices with a local connection such as a USB connection or cable connection. This technology enables, for example, a reader to press the pictures, icons and words on the regular printed ink and paper page and retrieve digital content from a computer, storage device or other media output device. Examples of such IHPMs 10 are described in U.S. Pat. Nos. 5,624,265, 5,757,304, 5,749,735, 5,763,112, 5,788,507, 5,839,905, 5,911,582, 5,957,695, 6,327,459 and 6,650,867, the disclosures of which are incorporated by reference.

For example, an exemplary remote IHPM 10 generally includes a remote control circuitry, a printed publication having printed content, and a membrane switch (for example) connected to the remote control circuitry. The remote control circuitry is capable of transmitting a wireless signal to a host device 12 wherein an application running on the host device 12 displays the desired results. The membrane switch of the interactive hybrid printed material 10 has an association with printed text and/or graphic content on the remote control. The function and/or data indicated by the text and/or graphic content associated with the pressed membrane switch is used by a host device 12 in displaying associated electronic content. The associated electronic content is encoded in one or more remote storage media 14. The interactive hybrid printed material 10 allows a user to simply activate the membrane switch (e.g., push button or touch sensitivity pad) on the interactive hybrid printed material 10 to cause the host device 12 to access electronic content from a remote server 14 or storage device 14.

A remote interactive hybrid printed material 10 includes a remote control circuitry, a printed publication having printed content, and a membrane switch connected to the remote control circuitry. The membrane switch may be any type of device capable of sensing and responding to pressure—for example, a push button, koala pad, or touch sensitivity pad. In an exemplary embodiment, the membrane switch of the interactive hybrid printed material 10 has an association with text and/or graphic content on the remote interactive hybrid printed material 10. The associated electronic content and the membrane switch have a remote electronic association implemented through a wireless signal encoded with the remote interactive hybrid printed material 10. It is also within the scope of the invention to utilize any alternative touch-sensing or location sensing device in place of the membrane switch.

An exemplary embodiment of the present invention may also utilize the locally connected interactive hybrid printed material 10 in place of the remotely connected device. The locally connected IHPM 10 likewise includes the printed publication having printed content and the membrane switch; however, in place of the remote control circuitry of the remote IHPM 10 is circuitry that transmits the touch location and other information over local connections.

When the user touches the text and/or graphics on the interactive hybrid printed material 10, pressure from the touch actuates the underlying membrane switch. In response to the activation of the membrane switch, the circuitry of the interactive hybrid printed material 10 generates and transmits a signal to a host device 12. As used herein, the term "host device" 12 is intended to mean any electronic device such as a computer, television, personal digital assistant, or cell phone that is able to output or display digital content. The signal from the remote interactive hybrid printed material 10 carries data (e.g., x and y coordinates) indicative of the touched location and/or the touched item on the interactive hybrid printed material 10.

Figure 2:
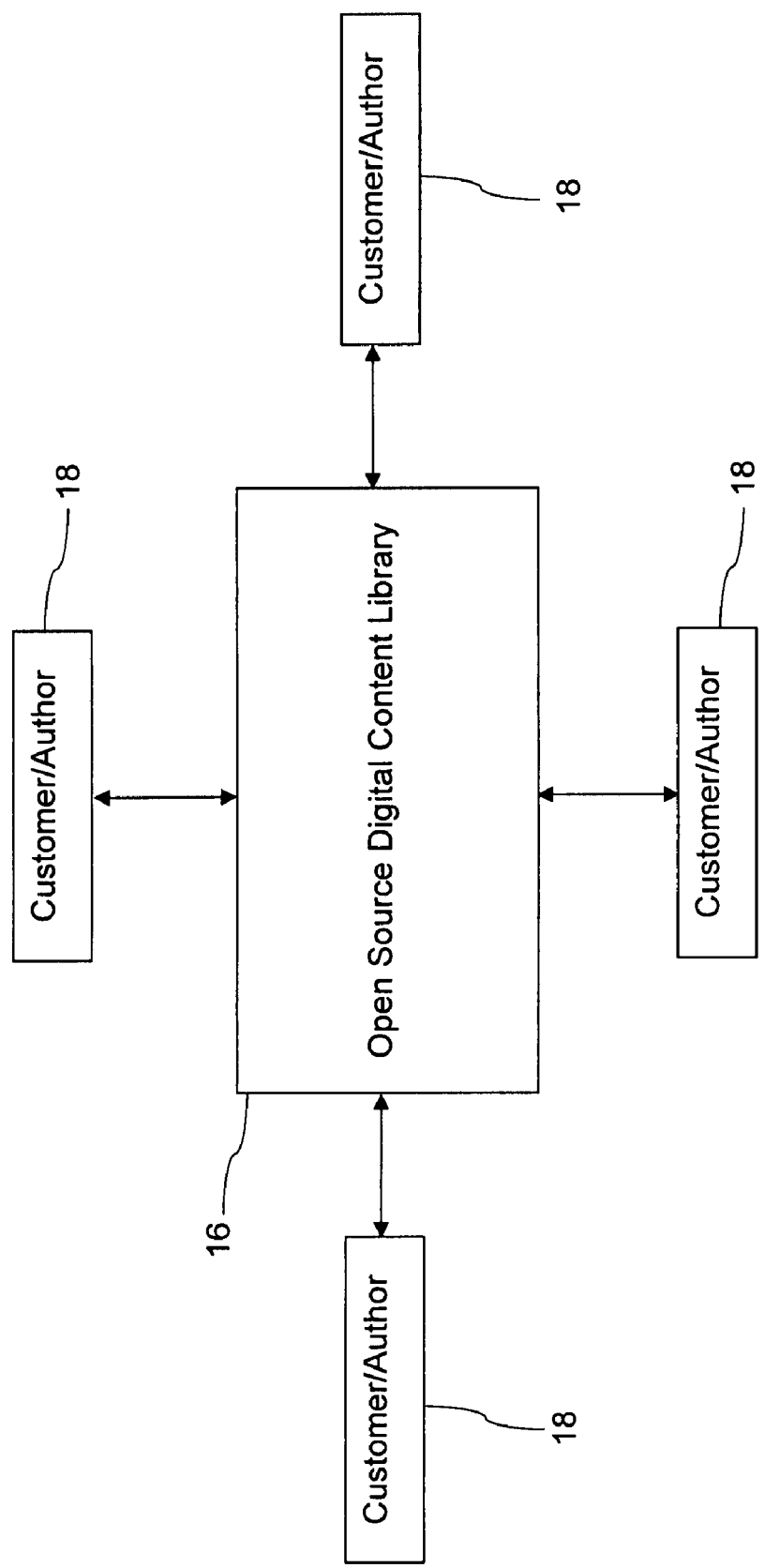
FIG. 2 is a diagram of an exemplary embodiment of an open source publishing model.
Figure 3:
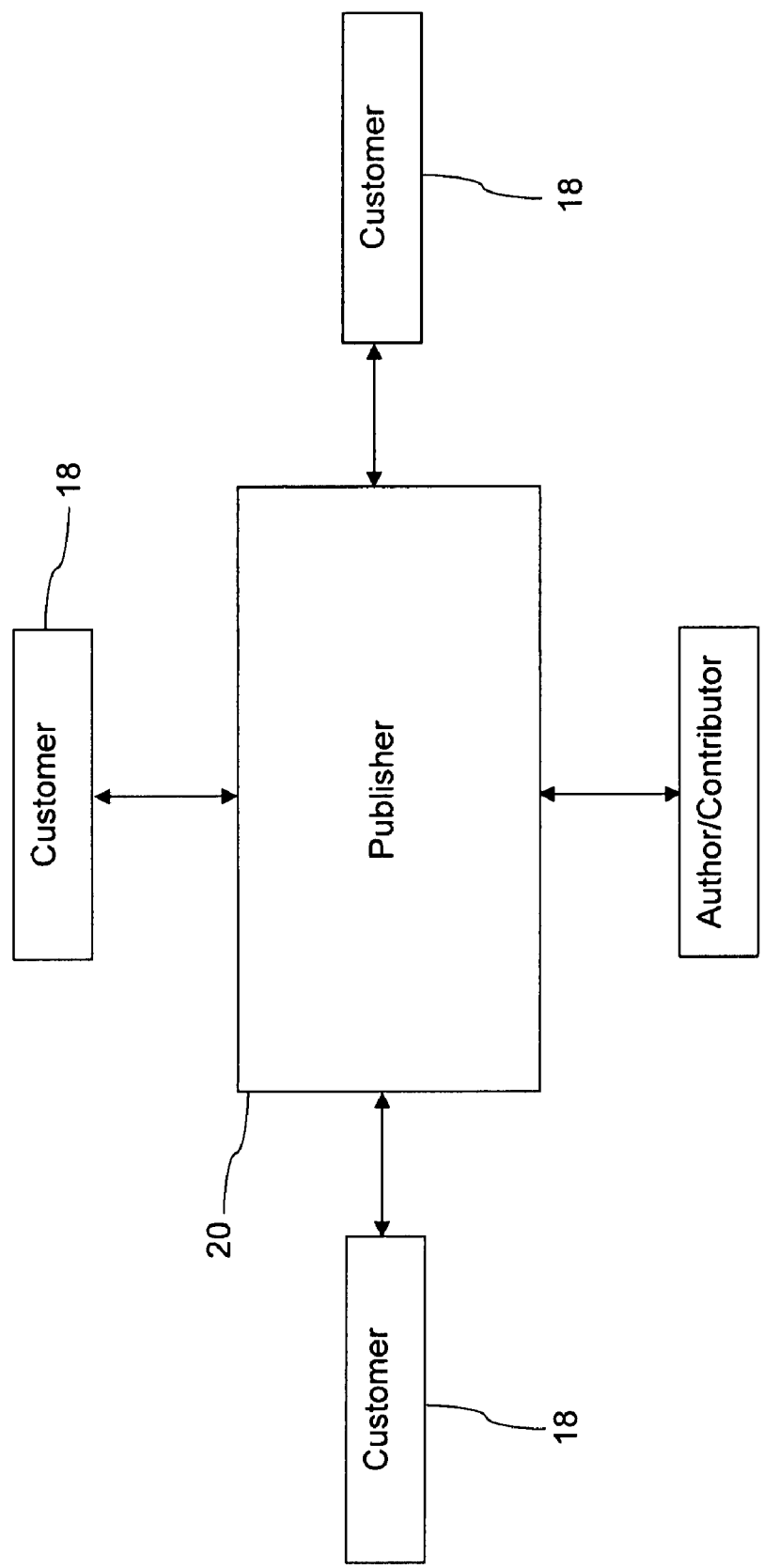
FIG. 3 is a diagram of an example of a traditional publishing model.

In accordance with the present invention and FIGS. 2 and 3, an open source publishing method and system is disclosed that allows individuals (such as customers) to select digital content objects from a database of available digital content for use in the development of interactive hybrid printed material 10. The present invention further discloses a depository for digital content (an "open source library" 16). This open source library is accessible through and/or stored on a network resource, a server device 14, a website, a hard drive, or any other storage device.

As used herein, "digital content" refers to the content that resides in the digital space and is available to be retrieved and displayed upon actuation of the membrane switch on the interactive hybrid printed material 10. Instead of relying on outside publishers 26 to provide the digital content available to be retrieved and displayed on a host device 12, individuals 18 may choose from digital content in an open source library 16. The digital content present in the open source library 16 may be shared amongst the users 18 of the open source library 16.

In an exemplary embodiment, the present invention provides a printed publication having printed content, a storage device 14, an interactive user device 10, and an output device 12. The printed publication having printed content in correlation with the interactive user device 10 (such as an IHPM) allows a user to actuate the membrane switch of the interactive user device 10. This actuation of the membrane switch causes one or more retrieval signals to be generated. These retrieval signals may correspond to the printed content corresponding to the actuated membrane switch. The storage device 14 may include a content database 16 (or open source library 16) containing digital content. The interactive user device 10 is in communication with the storage device 14. The interactive user device 10 communicates with the storage device 14 to determine what digital content is associated with the actuation of the membrane switch and where the associated digital content is located in the storage device 14. After determining the location of the associated digital content within the storage device 14, the digital content is retrieved and transmitted to the output device 12. The output device 12 may be one or more of a computer device, a display device, an audio output device, a video output device, or other similar device.

One exemplary aspect of the present invention includes the ability of many users to access the content database 16 of digital content. The digital content stored within the storage device 14 may be associated with the printed content. While the printed content of a printed publication remains constant, the digital content corresponding to the printed content may changed by the user. This may be accomplished by associating digital content with a specific printed content item. The user may then store this association and the location of the digital content in a mapping database 22. The mapping database 22 is essentially a road map for directing an interactive user device 10 to the location of the requested digital content. Such a mapping database 22 may be implemented by many well known methods. One such method may be a Structured Query Language (SQL) database having records of each of the associations and digital content locations. In response to queries, this mapping database 22 may transmit the association and/or the location of the digital content to the requesting device. Upon receiving the location of the digital content, the output device 12 may output a representation of the digital content.

In an exemplary embodiment of the present invention, a user 18 may select from existing digital content that is present in the open source library 16 in order to create an interactive hybrid printed material 10. In other embodiments, a user 18 may also write, design, and/or create digital content and place or store this digital content in the open source library 16 for public use.

In another exemplary embodiment, the digital content deposited or stored in the open source library 16 is meta-tagged or categorized (such as by keyword) so that the content in the library 16 becomes searchable. In a particular embodiment, the content is meta-tagged (perhaps during the submission process) so that another user 18 can do a keyword search in order to locate content of interest. Meta-tagging may include creating a database for storing records of the digital content and associated keywords. This search database may be implemented by many well known methods. One such method may be a Structured Query Language (SQL) database having records of each of the keywords in relation to the digital content. In response to queries, this search database may transmit the keywords and location of the related digital content to the requesting device. For example, a developer of an interactive hybrid printed material 10 on butterflies may go to the open source content library 16 and search for "butterflies." This query upon the search database may result in responses corresponding to the keyword "butterflies." The results may include, for example, butterfly video clips from children in New Zealand, an audio description of migrating Monarch butterflies from a college professor, etc. In another embodiment, the library 16 may allow full-text searches of the digital content.

In yet another exemplary embodiment of the present invention, the individual developing the interactive hybrid printed material 10 is enabled to determine the needs and/or wants of the customer 18 and select from the open source library 16 the digital content to fulfill those needs and/or wants. In this sense, the individual developer can be thought of as the author.

As seen in FIG. 2, the customer 18 or user 18 of the interactive hybrid printed material 10 can be the author 18 of the material 10. With the use of the open source library 16, the customer 18 or user 18 of the interactive hybrid printed material 10 can determine his own needs and/or wants and select from the library 16 the digital content to meet those needs and/or wants. In this sense, the customer 18 can also be thought of as the author 18 of the interactive hybrid printed material 10. The customer 18 or user 18 does not need to rely on a publisher 26 or other third party to write, create, design, and/or choose the material that serves as the digital content (as shown in the traditional publishing process in FIG. 3). Instead, the user 18 is enabled to select and provide the digital content.

In a exemplary embodiment of the publishing method of the present invention, the digital content is readily modifiable by the user 18 or other individual 18. It is dynamic, not fixed, such that it can be customized for the individual user 18 of the interactive hybrid printed material 10.

Digital content may include audio content, video content, text content, picture content, graphic content, mathematics content, scientific content, sign language content, animation content, email content and/or Internet content or any other content file.

The apparatuses, uses, and methods disclosed herein have been described without reference to specific hardware. However, the apparatuses, uses, and methods disclosed herein have been described in a manner sufficient to enable persons of ordinary skill in the art to readily adapt commercially available hardware as may be needed to reduce any of the embodiments of the present invention to practice without undue experimentation.

Following from the above description and invention summaries, it should be apparent to persons of ordinary skill in the art that, while the methods and apparatuses herein described constitute exemplary embodiments of the present invention, it is to be understood that the inventions contained herein are not limited to the above precise embodiments and that changes may be made without departing from the scope of the invention as defined by the claims. Likewise, it is to be understood that the invention is defined by the claims and it is not necessary to meet any or all of the identified advantages or objects of the invention disclosed herein in order to fall within the scope of the claims, since inherent and/or unforeseen advantages of the present invention may exist even though they may not have been explicitly discussed herein.

What is claimed is:

1. A method of publishing content, the method comprising the steps of:

providing a printed publication having printed content; a storage device storing a content database having a plurality of digital content, an output device for outputting one or more representations of the plurality of digital content, and an interactive user device for generating one or more signals associated with retrieval of the plurality of digital content from the storage device based, at least in part, on input of a user;

accessing by the user the plurality of digital content;

associating one of the plurality of digital content with the printed content;

storing in a mapping database the association of one of the plurality of digital content with the printed content and a location within the storage device of the one of the plurality of digital content;

actuating by a user the interactive user device to generate the one or more signals associated with retrieval of the plurality of digital content;

querying the mapping database to determine the association of one of the plurality of digital content with the printed content and the location within storage device of the one of the plurality of digital content;

upon determining the location of the digital content, retrieving the digital content from the storage device; and outputting the one or more representations of the digital content to the output device.

2. The method of claim 1, wherein the accessing step includes the additional step of:
generating by the user additional digital content; and
storing the additional digital content on the storage device.

3. The method of claim 1, further comprising the step of:
allowing one or more third parties access to the plurality of digital content.

4. The method of claim 1, wherein the outputting step includes transmitting the one or more representation of the digital content to a display device.

5. The method of claim 1, wherein the outputting step includes transmitting the one or more representation of the digital content to an audio output device.

6. The method of claim 1, further comprising the step of:
categorizing the digital content for subsequent searching, the categorizing including associating keywords with the plurality of digital content and storing the keywords in a search database, the search database including the location within the storage device of each of the plurality of digital content.

7. The method of claim 1, wherein the plurality of digital content includes one or more of audio content, video content, text content, picture content, graphic content, mathematics content, scientific content, sign language content, animation content, email content and Internet content.

* * * * *